United States Patent
Pohlack

(10) Patent No.: US 9,405,708 B1
(45) Date of Patent: Aug. 2, 2016

(54) PREVENTING ATTACKS THAT RELY ON SAME-PAGE MERGING BY VIRTUALIZATION ENVIRONMENT GUESTS

(71) Applicant: Amazon Technologies, Inc., Seattle, WA (US)

(72) Inventor: Martin Thomas Pohlack, Dresden (DE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/614,077

(22) Filed: Feb. 4, 2015

(51) Int. Cl.
*G06F 12/14* (2006.01)

(52) U.S. Cl.
CPC .................................. *G06F 12/1408* (2013.01)

(58) Field of Classification Search
CPC .................................................... G06F 12/1408
USPC .......... 711/163, 147, 154; 718/1, 100; 726/22
See application file for complete search history.

(56) References Cited

U.S. PATENT DOCUMENTS

| 8,375,420 | B2 | 2/2013 | Farrell et al. | |
|---|---|---|---|---|
| 8,442,216 | B2* | 5/2013 | Lambert | G06F 7/725 380/28 |
| 8,661,536 | B2* | 2/2014 | Shumow | G06F 21/556 380/2 |
| 8,781,111 | B2* | 7/2014 | Qi | G06F 7/723 380/255 |
| 8,819,348 | B2* | 8/2014 | Gaither | G06F 12/0842 711/127 |
| 2003/0044003 | A1 | 3/2003 | Chari et al. | |
| 2008/0022102 | A1 | 1/2008 | Venkatesan et al. | |
| 2010/0332578 | A1 | 12/2010 | Gopal et al. | |
| 2011/0083019 | A1 | 4/2011 | Leppard et al. | |
| 2013/0007881 | A1 | 1/2013 | Liem et al. | |
| 2013/0301826 | A1 | 11/2013 | Gueron et al. | |
| 2014/0059688 | A1 | 2/2014 | Margalit | |
| 2015/0100791 | A1* | 4/2015 | Chen | G06F 12/1408 713/189 |

OTHER PUBLICATIONS

"Cryptographic nonce", Wikipedia, Updated Oct. 13, 2014, pp. 1-3.
http://en.wikipedia.org/wiki/Kernel_SamePage_Merging_%28KSM%29, Kernel SamePage Merging (KSM), Wikipedia, updated Sep. 16, 2013, downloaded Feb. 28, 2014, pp. 1-2.
Yuval Yarom and Katrina Falkner, "Flush+Reload: a High Resolution, Low Noise, L3 Cache Side-Channel Attack," Cryptology ePrint Archive, Report 2013/448, Jul. 18, 2013, pp. 1-9.
U.S. Appl. No. 14/715,333, filed May 18, 2015, Martin Thomas Pohlack.
U.S. Appl. No. 14/715,345, filed May 18, 2015, Martin Thomas Pohlack.

* cited by examiner

*Primary Examiner* — Stephen Elmore
(74) *Attorney, Agent, or Firm* — Robert C. Kowert; Meyertons, Hood, Kivlin, Kowert & Goetzel, P.C

(57) ABSTRACT

In a virtualization environment, a guest process may protect itself from potential timing side-channel attacks by other guest processes on the same host machine by taking steps to avoid same-page merging for memory pages that it accesses. Pages that include critical code (e.g., cryptographic functions) or sensitive data (e.g., cryptography keys) may be designated as important pages to protect from such attacks. A placeholder location of a specified size for storing a non-deterministic value (e.g., a random or pseudorandom number) may be inserted into these pages when instantiated, making them unlikely to match pages accessed by other guests. Therefore, the host machine may be unlikely to identify them as pages for which there is a same-page merging opportunity. The values in the placeholder locations may be updated periodically or in response to certain events (e.g., context switches between guests or the detection of same-page merging).

21 Claims, 8 Drawing Sheets

PREVENTING ATTACKS THAT RELY ON SAME-PAGE MERGING BY VIRTUALIZATION ENVIRONMENT GUESTS

BACKGROUND

The advent of virtualization technologies for commodity hardware has provided benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a service provider and be provided with varying numbers of virtual machine resources on an "as needed" basis or at least on an "as requested" basis.

In virtualized computing environments and in local computing systems, system resources, including physical memory pages, are sometimes shared between processes or applications executing in the system. For example, in a local system, malicious applications that attempt to spy on other executing processes or applications might share physical memory pages with those other processes or applications by means of a shared library. In a virtualized environment, malicious applications might share physical memory pages with a targeted process or application by means of Kernel SamePage Merging (KSM), in which identical memory pages are shared between different processes or applications (and, in some cases, users).

By measuring the timing of accesses to main memory on shared pages, a malicious application can be used to detect whether a target memory area resides in a cache. This cache residency can be correlated with recent usage of data in the memory area in the system by one of the processes or applications that shares access to the target memory area. An attacking program can continuously flush relevant memory areas from the caches in the system and observe the timing of accesses to those memory areas, thereby monitoring the behavior of a target program. Such attacks are sometimes referred to as timing side-channel attacks.

Some existing systems, in an attempt to prevent a timing side-channel attack, disable page de-duplication in the operating environment entirely. However, for virtualized environments, page de-duplication might be a legitimate and useful thing to do. Some hypervisors perform page de-duplication by default, and it can be difficult to fully disable page de-duplication. For example, if multiple virtual machines are started based on the same base image on disk, there can be many pages shared between them without the hypervisor doing anything. Note that in some operating systems, it is not possible to be sure whether an underlying hypervisor is disabling page de-duplication only for particular pages or for the entire shared memory system unless this feature can be completely controlled in a manner that is visible to a security module or another privileged user process. Similarly, on a local machine, it might be extremely impractical (and/or prohibitively costly in terms of time and/or resources) to disable page de-duplication. For example, disabling page de-duplication means that each application executing on the local machine require more memory, and application startup might be very slow because of the need to load all of the shared libraries for each application.

Figure 1:
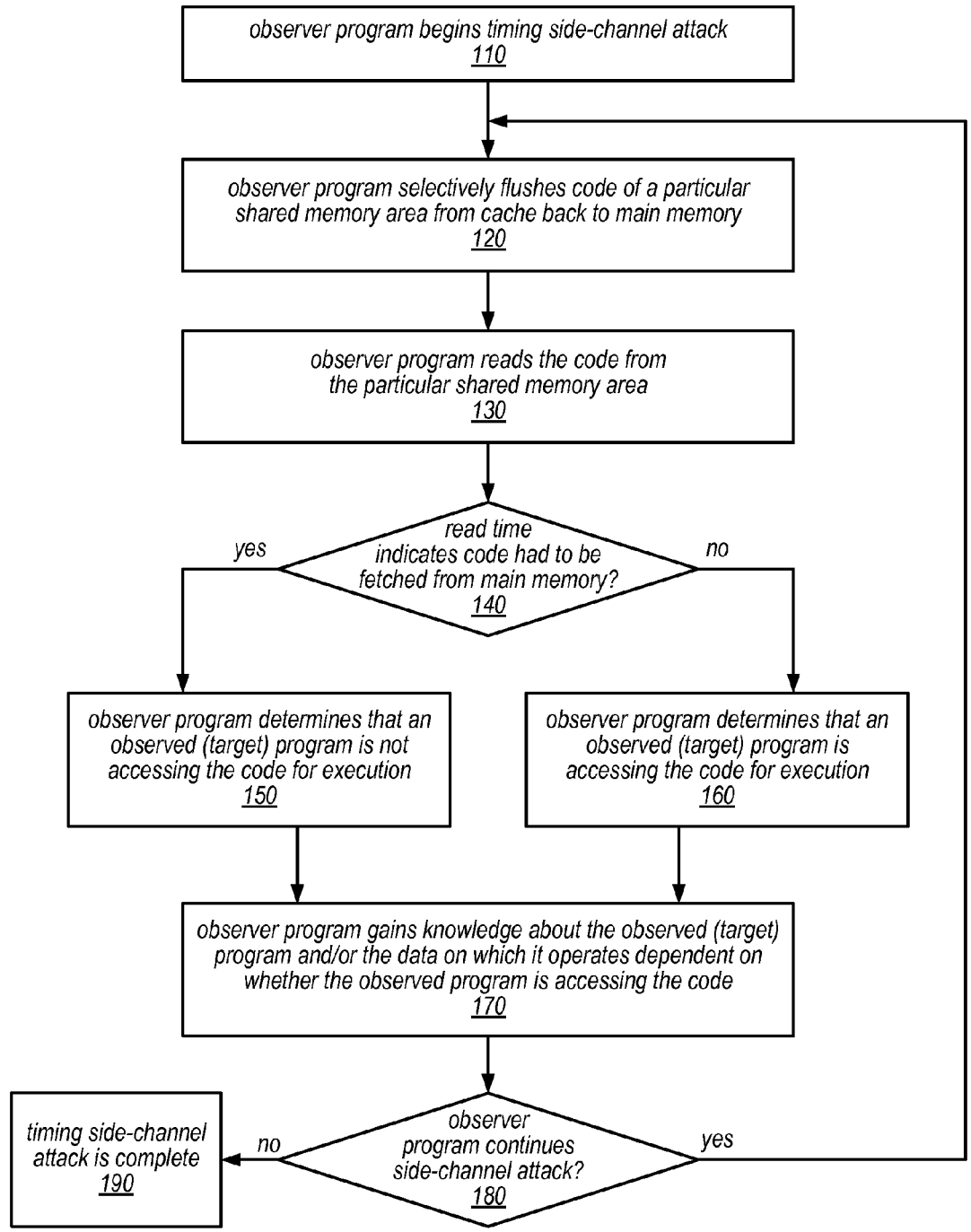
FIG. 1 is a flow diagram illustrating one example of a timing side-channel attack that may be detected, prevented, mitigated, and/or curtailed using the techniques described herein.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems and methods described herein may be used to detect, prevent, mitigate, and/or curtail timing side-channel attacks in virtualized computing systems and/or in local (single) systems in which physical memory pages are shared between processes, applications, and/or users. In some embodiments, a security component of an operating system, hypervisor, or virtual machine monitor (e.g., on a host machine) may use one or more performance monitors (e.g., hardware performance counters or other performance monitoring mechanisms) to detect the execution of cache line flush type instructions (such as the CLFLUSH instruction of the x86 instruction set) in the context of shared physical pages and timing side-channel attacks, and may take action to mitigate or curtail those attacks and/or to prevent subsequent attacks on a target process or application. For example, in some embodiments, a performance monitor may trigger an interrupt if a pre-determined number of cache line flush type instructions are executed. The security component (or an interrupt handler thereof that is invoked in response to the triggered interrupt) may then inspect the program instructions of the application that includes the cache line flush type instructions to determine whether those instructions are likely being used in a timing side-channel attack.

In response to determining that an attack is likely under way, the security component (or interrupt handler thereof) may take action to mitigate or curtail the attack. For example, in some embodiments, the security component (or interrupt handler thereof) may modify the program instructions or page mapping of the suspected attacking process or application to make accesses to portions of the shared memory targeted by the cache line flush type instructions (e.g., accesses to portions of the shared memory that are targeted for removal from a cache by the cache line flush type instructions) predictable or consistent, thereby removing the ability of the suspected attacker to determine whether another (target) process or application is accessing those portions of the shared memory. In various embodiments, the actions taken by the security component may include replacing the cache line flush type instructions of the suspected attacking process or application with trap type instructions, removing the cache line flush type instructions from the suspected attacking process or application, or inserting instructions immediately before or after the cache line flush type instructions from the suspected attacking process or application to change the behavior of the suspected attacking process and/or the timing behavior of accesses to the targeted portions of the shared memory.

In other embodiments, rather than relying on a security component on a host machine to detect, prevent, mitigate, and/or curtail timing side-channel attacks, an application executing on a guest virtual machine may protect itself from potential timing side-channel attacks by taking steps to avoid same-page merging for at least some of the memory pages that it accesses. For example, pages that include critical code (e.g., encryption functions) or sensitive data (e.g., cryptography keys or other secret information) may be designated as important pages that are to be protected from such attacks by other guest processes executing on the same host machine. In some such embodiments, a placeholder configured to store a unique, non-deterministic, and non-functional value (e.g., a random or pseudorandom number that does not alter execution of the application) may be inserted into these important pages, making them unlikely to match pages accessed by other guest processes. Therefore, the underlying host machine may also be unlikely to identify them as pages for which there is an opportunity to apply same-page merging. As described in more detail herein, in some embodiments, the values in the placeholder locations may be updated periodically or in response to certain trigger events (e.g., context switches between guests or the detection of same-page merging for a page in which a placeholder location resides).

In general, the term "side-channel" may refer to a channel of information flow in a computing system that was not intended for the use of processes or applications executing in the system, e.g., a channel of information flow that is not programmed explicitly by the operating system, but that can be opened in some systems in which shared resources are used. For example, in one type of timing side-channel attack, there may be at least two parties involved, the observation target and the observer (i.e., the attacker). These two parties may share system resources, including one or more processors (CPUs) and main memory, and as a consequence, they may both use the cache hierarchy that sits between the CPU(s) and main memory.

In such a timing side-channel attack, the attacking process or application may monitor the access times to various memory areas in order to determine whether a particular area of memory was in the cache before the attacking process or application accessed the particular memory area (e.g., before the attacker queried one or more locations in the particular memory area using a read or load type instruction) or whether it had to be fetched from main memory. In this case, the side-channel is a timing side-channel that allows the attacker to glean information about a target process or application by determining how long it takes to read or to write to particular memory locations. In this example, the attacker may also modify the side-channel, e.g., by clearing the cache selectively or fully using a cache line flush type instruction, if available. For example, the CLFLUSH instruction of the x86 instruction set can be used in any context (including in user applications) and can be used to remove all memory areas that are associated with a virtual address that is a parameter of the instruction from the cache hierarchy (i.e., to flush the cache lines corresponding to those memory areas from all memory caches). In other words, in order to remove the contents of a particular memory from the cache, a process or application may pass one or more addresses associated with the particular memory area to a CLFLUSH instruction or another similar cache line flush type instruction. The execution of the cache line flush type instruction may, in the hardware of the processor, clear all of the corresponding cache lines and move their contents back to memory, such that when and if a process or application subsequently attempts to access them, they will have to be fetched from main memory. Because fetching information from main memory takes much longer than fetching that same information from cache (e.g., on the order of several hundred cycles compared with a single digit number of cycles for information resident in a level 1 cache), an attacking program that accesses the particular memory area after flushing its contents from the cache may be able to distinguish whether another process or application has accessed the particular memory area between the time that the cache line flush type instruction was executed by the attacking program and the time the attacking program subsequently accesses the particular memory area. Note that the CLFLUSH instruction is not a privileged instruction and does not trap. Therefore, it cannot easily be virtualized or disabled to prevent or slow down the attack.

In many (if not most) modern operating systems, there is a lot of code that is not directly linked into the program itself but resides in shared libraries. In general, it would be wasteful to include the code in main memory multiple times, especially portions of the code that are not modified. For example, the shared code itself (if not also the data) may typically be mapped in read-only mode. Therefore, only one physical copy of the shared code may need to be maintained in main memory. The physical memory pages that contain the shared code may be mapped into the different processes executing in the system using different virtual addresses. However, since the physical memory pages are shared, whenever a program A executes a cache line flush type instruction to flush a certain memory area from the cache, this has an effect on the physical page (and/or on the copies of the physical page that the cache holds). In other words, the cache line flush type instruction will flush the contents of the cache to the one and only copy of the code in physical memory, and the effect of the cache line flush type instruction can be seen in all the other programs that map in the same shared memory area.

In one example of a timing side-channel attack, an attacking program maps in the same code that is used by an encryption program and then starts to selectively flush certain areas of the code from the cache and to measure the time it takes to read those memory areas back (e.g., it executes multiple cache line flush type instructions, each followed by a read or load type instruction). In this example, by observing the timing of the read or load type instructions, the attacking program can determine whether another process or application has used (or is currently using) various portions of the code (e.g., to determine if particular code paths or branches are being taken). Using this approach, the attacking program may be able to determine what the encryption program is doing by observing which code paths or branches it takes. For example, if the attacking program determines that a target program executed branch A, and the attacking program knows the specific value of a branch condition that leads to this branch being taken, it may be able to draw conclusions about the data that is being processed by the target program. In this example, such an attack may be used to extract cryptographic keys from the target program.

Note that some systems that implement virtualization include a same page sharing feature (e.g., implemented by the hypervisor), which may also be referred to herein as "same-page merging". In such systems, sharing of physical pages may not only be happening within one virtual machine, but may be propagated throughout the whole system. For example, the hypervisor may scan the contents of physical memory pages, and whenever it finds the same pages, it may merge them into a single copy backed by one physical page. In such systems, a side-channel attack may not only be implemented within a single guest but across guests.

One example of a timing side-channel attack that may be detected, prevented, mitigated, and/or curtailed using the techniques described herein is illustrated by the flow diagram in FIG. 1. As illustrated in this example, an observer program begins a timing side-channel attack (as in 110), and selectively flushes the code of a particular shared memory area from a cache back to main memory (as in 120). The observer program then reads the code (i.e., the code that it flushed from the cache) from the particular shared memory area, as in 130.

If the read time indicates that the code did not have to be fetched from main memory (e.g., that it had been read back into the cache since it was flushed from the cache by the observer program), the observer program determines that an observed (target) program is currently and/or frequently accessing the code in that particular shared memory area for execution. This is illustrated in FIG. 1 by the negative exit from 140 and 160. On the other hand, if the read time indicates that the code had to be fetched from main memory (e.g., that it had not been read back into the cache since it was flushed from the cache by the observer program), the observer program determines that the observed (target) program is not currently or frequently accessing the code in that particular shared memory area for execution. This is illustrated in FIG. 1 by the positive exit from 140 and 150.

In either case, the observer program gains knowledge about the observed (target) program and/or the data on which it operates dependent on whether or not the observed program is currently and/or frequently accessing the code in the particular shared memory area, as in 170. In other words, the observer program is able to infer something about the observed (target) program and/or the data on which it operates dependent on whether or not the observed program has recently executed or is currently executing particular portions of the code (e.g., code on particular code paths or branches). If the observer program is continuing its side-channel attack (shown as the positive exit from 180), the operations illustrated at 120 to 170 are repeated, possibly targeting different shared memory locations, as the observer program attempts to gain more knowledge about the observed (target) program and/or the data on which it operates. This is illustrated in FIG. 1 by the feedback from the positive exit of 180 to 120. If the observer program is not continuing its side-channel attack (or once the observer program completes its attack using multiple iterations of the operations illustrated in FIG. 1), the timing side-channel attack is complete. This is illustrated in FIG. 1 by the negative exit from 180 and 190.

As previously noted, in virtualized environments (and also in some local systems), shared pages between attackers (programs that try to spy on target programs) and target programs might share physical memory pages, either via means of shared libraries in a single system or via a page de-duplication technique involving same-page merging (e.g., kernel-samepage-merging, or KSM). In these systems, timing accesses to main memory on shared pages can be used to detect whether a target memory area resides in a cache. This cache residency correlates with recent usage of data in the memory area in the system. In some cases, an attacker can continuously flush relevant memory areas from caches and observe timing again, thereby monitoring the behavior of the target program.

While some systems that provide virtualization services to clients may employ techniques on the host (e.g., on the bare metal on a host that has multiple guests executing on it) to detect, prevent, mitigate, and/or curtail this type of timing side-channel attack (e.g., by emulating a trap on a cache line flush type instruction), the techniques described herein may be used in systems in which virtualization service clients cannot (or would rather not) rely on the host (or, more specifically, on the hypervisor) to protect their guest processes from other guests. While the core function of the hypervisor is to separate the guests, the types of timing side-channel attacks that are the target of the techniques described above can be difficult for the host to prevent. In some cases, while it could be possible to have some code in the hypervisor that does most of the work of protecting important or sensitive pages in memory, along with a driver in the guest that tells the hypervisor what it thinks is important to protect, in typical scenarios, the hypervisor resides in a different domain of trust. In other words, the guest operating systems and guest applications executing thereof may be controlled by virtualization service customers (e.g., service subscribers), and those customers have (more or less) complete control over them. The hypervisor, on the other hand, may be provided by the service provider, which typically does not give access to the hypervisor source code or binary code to its customers. While customers could, in some cases, trust the service provider as far as what the hypervisor actually does, and/or could trust that the service provider does not attempt same-page merging at all, this may be contrary to the customer's security policies on a political or organizational level.

In some embodiments, a guest that is one of multiple guests operating in a given virtualized environment may only have access to its own domain. Therefore, since it cannot operate outside of that domain (and assuming there is not a trusted cooperating process on the host), the options for a guest to use in avoiding timing side-channel attacks in this context (e.g., attacks in which another misbehaving guest attempts to take advantage of shared memory pages to spy on the code and/or data pages that are being accessed by the guest) may be limited. In some embodiments, the techniques described herein may be used to circumvent the negative effects of same-page merging from inside the virtualized environment without controlling that environment. For example, in some embodiments, only mechanisms in the typical target programs may be employed in avoiding timing side-channel attacks based on same-page merging, with little or no help from the guest operating system and without help from the virtualization system.

As described in more detail below, rather than disabling same-page merging or other types of de-duplication mechanisms system-wide or for all memory pages accessed by a particular guest, the techniques described herein may be applied to specific memory pages that may be more important to protect than others. For example, in some embodiments, a target program may have a notion about which of the memory pages it uses should be considered "interesting memory pages" (IMP) that are more important to protect from timing side-channel attacks. For example, these interesting memory pages may include any pages that are involved in critical operations, such as operations that in some way process secret data (e.g., crypto keys, or important clear-text data). As described above, same-page merging techniques such as KSM rely on the fact that whole pages may be similar in distinct processes or virtual machines. Thus, code pages are often the main target of such attacks because there is a realistic chance for an attacker to have similar encryption programs or libraries available. In some cases dynamically constructed structures in memory may be a target of an attack, e.g., if their layout is somewhat predictable at the page level.

As described in more detail below, in some embodiments, preventing timing side-channel attacks from inside a guest virtual machine may include using of one of several mechanisms to break one of the requirements for same-page merging, i.e., that the content of the target page is similar to the content of a page accessed by another guest. More specifically, in each of the memory pages accessed by the guests that is identified as being important to protect from these types of attacks (e.g., those pages that are considered to be "critical", "interesting", or "sensitive" due to their content), a small space (e.g., a placeholder location) may be inserted into or reserved within the page, and into that space, a random value may be written (either once or repeatedly, e.g., on a regular interval). In other words, in some embodiments, the techniques described herein may be used to make pages that are typically targeted by same-page merging unique be inserting a NONCE (e.g., an arbitrary value, such as a random or pseudorandom number that is hard for others to predict) somewhere into each of those pages. In some embodiments, the insertion of the NONCE may greatly decrease the chance that an attacker on the machine has a copy of the exact same page. Therefore (since the content of the page was changed to include the NONCE), the underlying host machine is extremely unlikely to identify the page as one for which there is an opportunity to perform same-page merging.

In one example, data structures located in interesting memory pages (e.g., IMPs) may contain a small field (e.g., a 4-byte field) in which to store a NONCE. In another example, sensitive code that is located in important pages (e.g., code of a cryptography library) may be created such that each memory page contains a writable hole in which to store a NONCE, without corrupting the actual code. In this example, the placeholder locations for each NONCE may be located between two small functions or inside longer functions (e.g., in an area over which, at runtime, the actual execution of the function jumps). In some embodiments, each IMP may contain at least one storage area for a NONCE.

Note that writing a NONCE into a page may fulfill two purposes. For example, it may trigger a de-duplication, if the page had already been merged, as those pages are typically handled by a copy-on-write mechanism. In addition, it may prevent future merging by making the page content unique. As described in more detail herein, there may be different mechanisms used to insert a NONCE placeholder into an IMP, in different embodiments. For example, in some embodiments, such placeholders may be inserted into an application or library by the programmer, while in other embodiments, they may be inserted into an application or library by a compiler, a library function, or an operating system service. In some embodiments, a NONCE may be written into a placeholder when the page in which it resides is instantiated. For example, during an initialization or instantiation operation, a random or pseudorandom number generator may be called to generate the value that is written into the placeholder location. In general, the NONCE may be selected or generated in any way that prevents its prediction by a potential attacker.

Figure 2:
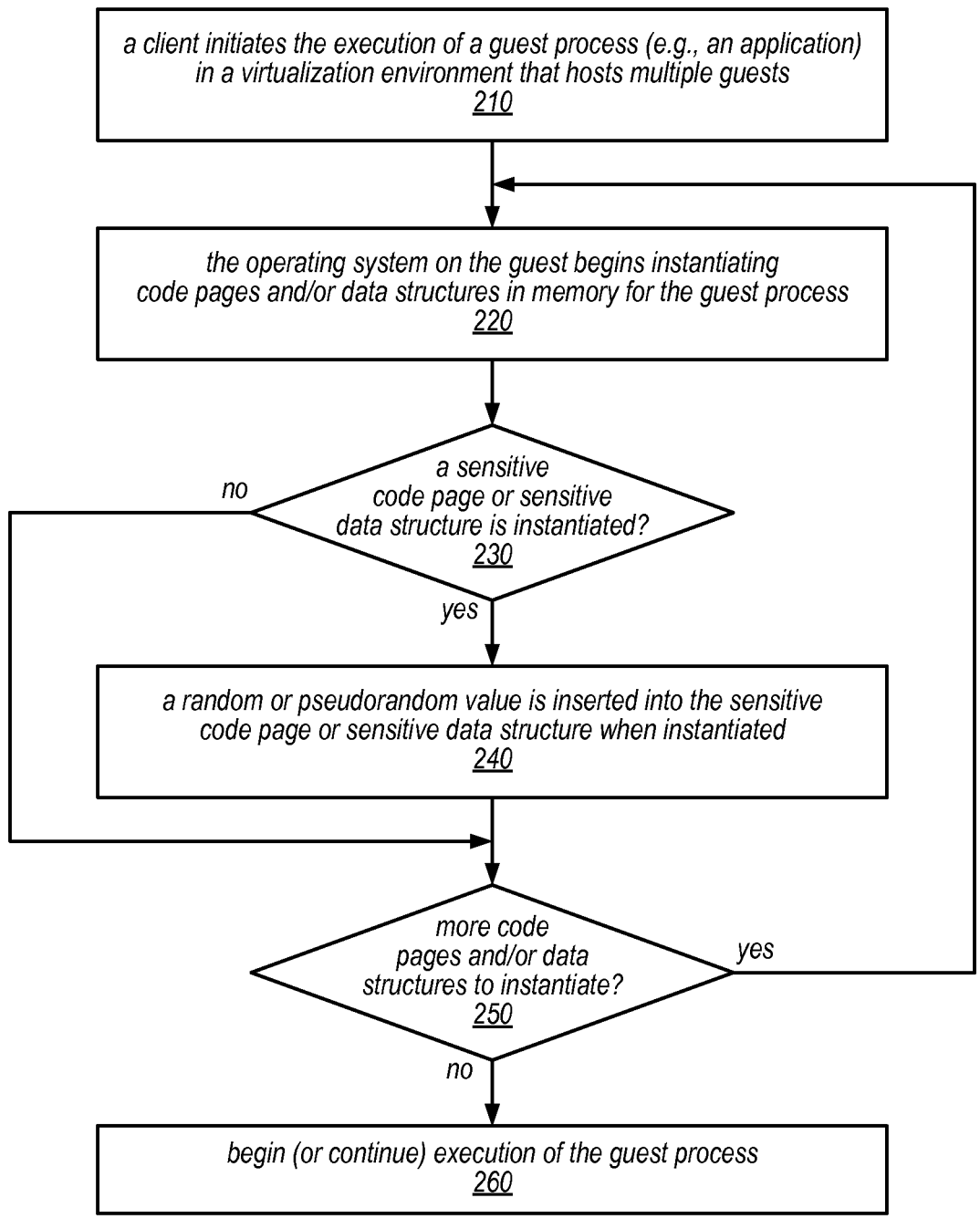
FIG. 2 is a flow diagram illustrating one embodiment of a method for avoiding timing side-channel attacks by attempting to make important pages unique.

One embodiment of a method for avoiding timing side-channel attacks by attempting to make important pages unique is illustrated by the flow diagram in FIG. 2. As illustrated at 210, in this example, the method may include a client (e.g., a client application, service provider customer or subscriber) initiating the execution of a guest process (e.g., an application) in a virtualization environment that hosts multiple guests (e.g., a multi-tenant virtualization environment) and in which same-page merging is performed. The method may also include the operating system on the guest beginning to instantiate code pages and/or data structures in memory for the guest process, as in 220.

If a sensitive code page or sensitive data structure is instantiated (e.g., one that includes cryptography information or other types of secret information, that is likely to be a target of a KSM attack, or that should otherwise be protected from such an attack), shown as the positive exit from 230, the method may include inserting a random or pseudorandom number into the sensitive code page or sensitive data structure (e.g., inserting a random or pseudorandom number into each of one or more pages thereof) when it is instantiated, as in 240. However, if an instantiated code page or data structure is not considered to be sensitive, no such insertion may be performed for that code page or data structure when it is instantiated. This is illustrated in FIG. 2 as the path from the negative exit a 230 to 250.

As illustrated in this example, if there are more code pages and/or data structures to instantiate, shown as the positive exit from 250, the method may include repeating the operations at 220-240 (as applicable) for each of the other code pages and/or data structures (or pages thereof). On the other hand, if (or once) there are no additional code pages or data structures to instantiate, shown as the negative exit from 250, the method may include beginning (or continuing) execution of the guest process, as in 260. For example, in some embodiments, the guest process may begin executing before all of its code pages and/or data structures have been instantiated in memory, while in other embodiments, execution may not begin until all of the code pages or data structures have been instantiated in memory or, in some cases, until all of the data structures have been initialized.

In various embodiments, memory pages that are identified or designated as being considered important pages may include, but may not be limited to, any or all of the following types: pages that include any form of "clear-text data" (e.g., data that is transmitted and/or stored in an unencrypted form, such as ASCII data or any data that is readable by a human or by a computer program without the need for decryption) for which protection is desired, pages that contain keys for cryptography operations, or pages that include code for sensitive operations. For example, in some cases, a page that is identified or designated as being considered an important page may include clear-text data that is an input to an encryption operation and that should not be exposed to other guests or their processes under any circumstances. Similarly, keys for cryptography operations should not be exposed to other guests or their processes under any circumstances.

In some cases, an attack on a memory page that includes code for sensitive operations of a guest application (or sensitive operation of a library that is accessed by a guest application) may work by observing which branch was taken on the code page (e.g., by monitoring the cache lines that belong to different branches). More specifically, by monitoring which branch was taken in the code for a cryptography operation, an attacker can sometimes make a deduction about certain bits in the crypto keys. For example, one encryption algorithm performs or elides a multiplication operation dependent on whether a certain bit in the input key is zero or one. Therefore, if an attacker samples the branches taken within that code at a high frequency, it may be able to determine or assemble the entire key (e.g., by monitoring when the multiplication operation was, or was not, performed on the code page).

In some embodiments, in order to avoid same-page merging (thus preventing or curtailing a timing side-channel attack) for sensitive code pages, a small placeholder area may be reserved on those pages into which a NONCE can be written (e.g., once, when the page is instantiated, or multiple times). Note that code pages are typically only available in read-only mode for programs (e.g., for robustness and because applications typically do not modify their own code or shared code). However, in order to apply the techniques described herein for avoiding same-page merging, the systems described herein may make a writable copy of a code page that is a potential target for timing side-channel attacks and/or may map the code page in a way that allows these techniques to be applied. Note that, if the code page is already shared, a copy of the code page may be created implicitly by the operation system layers when it is written to. Note also that, in other embodiments, the systems described herein may perform an in-place modification of the code page and may disassociate the code page from a disk backing store. As noted above, if there are lengthy sensitive functions within a guest application or a library that is accessed by a guest application (e.g., sensitive functions whose code spans multiple memory pages), the systems described herein may insert such a placeholder area into each of those pages, in some embodiments. Note that in some embodiments, the systems described herein may provide compiler support for inserting placeholder areas into multiple pages over which the code for a sensitive function is spread, or may implement a critical function in a way that provides more control over the code of the critical function to a guest.

In general, the techniques described herein for avoiding same-page merging may be applied to any of these types of important pages or to any other types of pages for which it may be reasonable to expect a timing side-channel attack and/or for which such an attack would be undesirable (e.g., pages that contain guest application code, code for implementing one or more library functions, code for implementing one or more encryption or decryption functions, sensitive or secret client data, cryptography keys or encryption data, etc.). Note that, even if an attacker has an idea about what a sensitive code page (e.g., a code page in a shared library) looks like and has an idea about the location of a placeholder into which a random number is written on that code page, the attacker may not have any idea about the content of the placeholder (e.g., the value of the random number written there).

As described in more detail below, there may be several different ways to perform inserting a NONCE placeholder into a memory page, initializing the content of the placeholder location, and/or updating the content of the placeholder location, in different embodiments. For example, in various embodiments, the insertion of a NONCE placeholder may be performed automatically (e.g., at compile time), or may be performed by the programmer of a guest application or library. Similarly, the initialization of the content of such a placeholder may be performed during instantiation of the memory page in which the placeholder resides (e.g., by a process or thread of the guest application, guest library, or guest operating system, in different embodiments). In some embodiments, a process or thread of the guest application, guest library, or guest operating system may be configured to update the content of the placeholder under certain circumstances.

In one example, a guest application knows the layout of its own data (e.g., its data structures), has access to the memory into which its data structures (and, in some cases, its code) are instantiated, and knows which memory pages are important to guard. Therefore, this guest application may be constructed such that, in each of those important pages, there is a small NONCE placeholder. In this example, when the important pages are instantiated in the memory, a random or pseudo-random value may be written into the NONCE placeholders on those pages. In some embodiments, during execution, using a background thread, the guest application may update the NONCE locations periodically (e.g., once every second or so). Note that periodically (or occasionally, e.g., in response to a particular trigger condition) updating a NONCE value on an important page may further decrease the likelihood that the page is a target of same-page merging and/or a timing side-channel attack.

Note also that, as described in more detail below, the mechanisms described herein for avoiding same-page merging and timing side-channel attacks may support the specification of various configurable parameter values. For example, one or more configurable parameters may be used to specify the sizes of the memory locations that are reserved as NONCE placeholders for a guest application or a guest library, or function thereof (e.g., a single parameter that specifies the size of all NONCE placeholder locations for the guest application or guest library, or multiple parameters, each of which specifies the size of one or more NONCE placeholder locations). In another example, one or more configurable parameters may be used to specify the frequency at which the contents of the memory locations that are reserved as NONCE placeholders are updated for a guest application or a guest library, or function thereof (e.g., a single parameter that specifies the update frequency for all NONCE placeholder locations for the guest application or guest library, or multiple parameters, each of which specifies the update frequency for one or more NONCE placeholder locations). In some embodiments, the conditions that may trigger an operation to update the content of a NONCE placeholder location may include detecting that the memory page on which the placeholder location resides has been shared using same-page merging.

Figure 3:
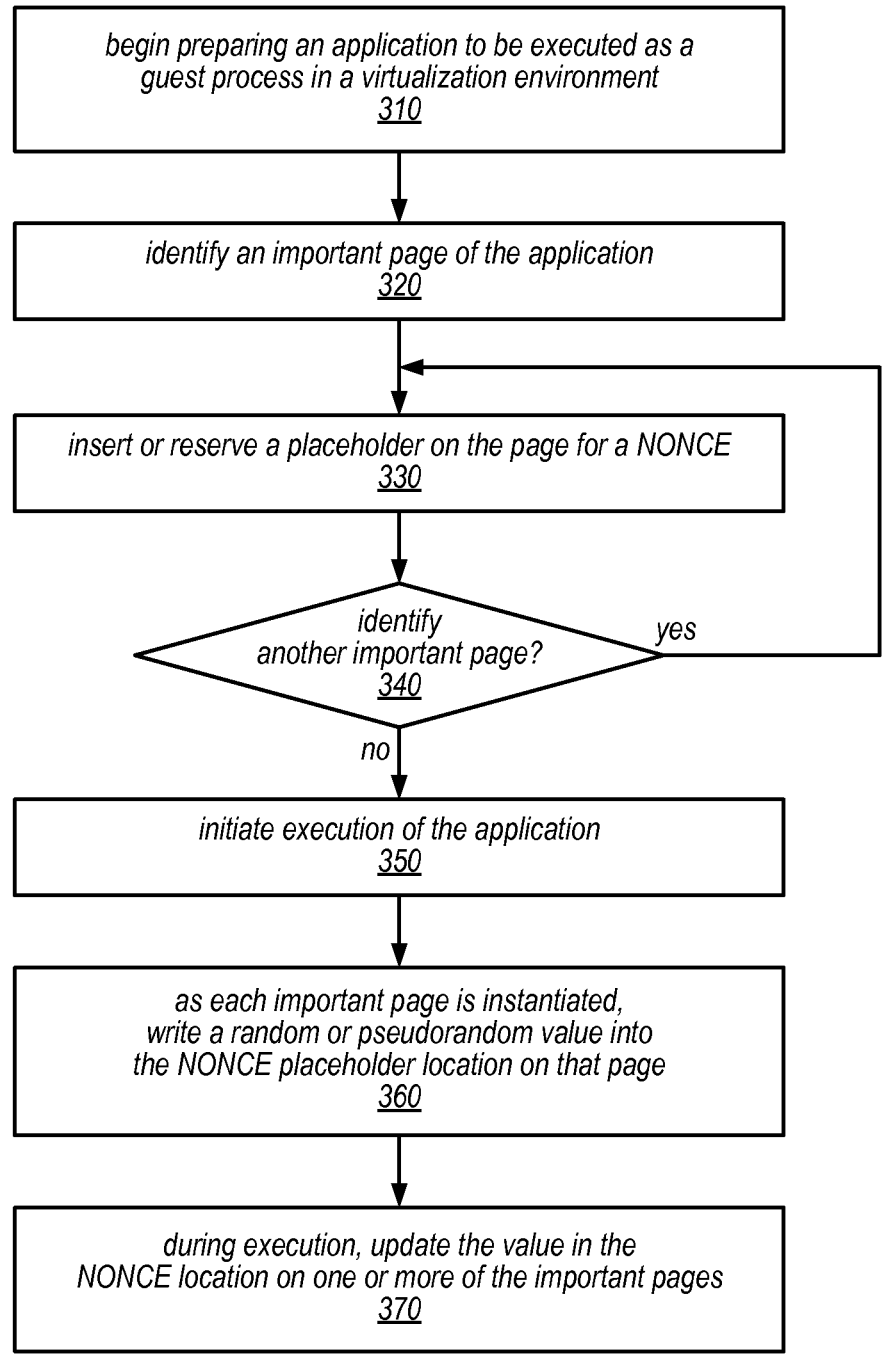
FIG. 3 is a flow diagram illustrating one embodiment of a method for preparing and executing the code of a guest process in a manner that avoids same-page merging for important pages.

One embodiment of a method for preparing and executing the code of a guest process in a manner that avoids same-page merging for important pages is illustrated by the flow diagram in FIG. 3. As illustrated at 310, in this example, the method may include beginning preparation of an application that is to be executed as a guest process in a virtualization environment. The method may include identifying an important page of the application, as in 320. For example, the page may contain sensitive code or data structures, and may be identified and/or marked as an important page by the programmer or by a compiler, in different embodiments. In response to identifying an important page of the application, the method may include inserting or reserving a placeholder on the page for a NONCE, as in 330. Note that, in some embodiments, the size of the placeholder location may be configurable (e.g., it may be specified using an input parameter that is exposed by the application or by a guest library or guest operating system).

As illustrated in this example, if one or more other important pages of the application are identified, shown as the positive exit from 340, the method may include repeating the operation illustrated at 330 for each additional important page that is identified. If (or once) all of the important pages in the application have been identified, the method may continue at 350, as shown by the path from the negative exit of 340 to 350.

As illustrated in FIG. 3, at some point after the application is prepared for execution, the method may include initiating execution of the application, as in 350. In this case, as each of the previously identified important pages is instantiated, the method may include writing a random or pseudorandom value into the NONCE placeholder location on that page, as in 360. For example, the method may include writing into the NONCE placeholder a value that was generated using a random or pseudorandom number generator or a value that was selected or generated using any other mechanism that produces a value that is unlikely to be guessed by an attacking guest process.

As illustrated in this example and described in more detail below, in some embodiments, the method may include, during execution, updating the value stored in the NONCE location on one or more of the previously identified important pages, as in 370. For example, the method may include writing a new value to the NONCE location or re-writing the same value into the NONCE placeholder location, either of which may trigger a de-duplication for the page and/or prevent future same-page merging for the page. As described herein, the update may be performed by the guest application (or a process or thread thereof), or by a background process or thread of a library or operating system service on the guest, in different embodiments. In other words, code that implements updating the NONCE location may reside within the guest application that accesses the memory pages of interest (the IMPs), in embodiments in which updates of such NONCEs are performed on an application basis. In other embodiments, the code that implements updating the NONCE location may reside within an active part of a library on the guest that provides the sensitive code or may be part of the guest operating system. Note that the use of any of these approaches may allow a guest to protect itself from timing side-channel attacks without having to rely on a hypervisor or virtual machine monitor on the underlying host machine. Note, however, that in some embodiments, the guest application may depend on an external mechanism (e.g., the actions of a programmer and/or compiler) to provide NONCE placeholder locations in the IMPs in a manner that allows random or pseudorandom values to be safely written into them by the guest application, library, or operating system.

As noted above, some embodiments may support the use of various configurable parameters that can be adapted to different circumstances (e.g., upon initialization of a guest process that employs the techniques described herein and/or during execution of such processes). One of these parameters may specify the size of one (or more) of the NONCE values that are inserted into IMPs (e.g., in bytes). Note that, in various embodiments, the value of the size parameter may determine the likelihood of accidentally having similar pages in the system (e.g., within a system that provides virtualization services, as described herein). For example, in some cases, an attacker may have an idea about what a code page looks like, and may have an idea about where the random number would be on that page, but may not have an idea about the content of the random number. An attacker trying to construct similar pages by guessing the NONCE values and/or by providing many similar page variants at the same time (each with a different NONCE value) may find it increasingly difficult to succeed as the NONCE size increases. For example, if the NONCE value contains only one byte, an attacker would only need 256 copies of the code page to find a match, making it easy to guess the right random number. If the NONCE value includes 64 bits or even more, an attacker would have to use a lot of memory to create many, many copies of the code page, and the likelihood that the host system would detect that those pages are similar would be very small. In embodiments in which the value of the size parameter is configurable, a trade-off may be made between the size of the NONCE placeholder location and the likelihood that an attacker can guess the value written in that location, and the value of the size parameter may be adjusted up or down in response to determining that an initial trade-off was not optimal.

Another configurable parameter may be used to specify the frequency at which the values in one (or more) NONCE placeholder locations are updated. In some embodiments, increasing the value of this update frequency parameter may have a similar effect on the likelihood that a corresponding page is subjected to same-page merging by more frequently de-duplicating any merged pages (including accidentally merged pages), and therefore reducing the time windows during which timing side-channel attacks are possible. In some such embodiments, instead of just inserting a random number into a NONCE placeholder location in each IMP once, values may be written into the NONCE placeholder locations multiple times (e.g., periodically, according to the value of the update frequency parameter). For example, the update frequency parameter value may be initialized such that the value in a NONCE placeholder location is updated once every second, and then may be adjusted during execution depending on whether (or how often) timing side-channel attacks are attempted. In general, the values of these two parameters may be statically choose based on experience and/or on assumptions about the virtualization environment, and may be adjusted later, if those assumptions are found to be incorrect.

Note that, in some embodiments, even if an attacker accidentally guesses the random number that was written into a NONCE placeholder location, by repeatedly updating it (and even if the same value is re-written into the placeholder location) the effect on the underlying system may be that, because the page was written and because the hypervisor would get a page fault and has a previously shared page in read-only state), the hypervisor or operating system would have to de-duplicate the page in response to this event, even if this same data is written back. In some embodiments, this approach may ensure that the page is not shared, or that it is only shared for very short period of time.

Note that if an IMP is subjected to same-page merging, one or more additional countermeasures may be taken by a guest process (e.g., the application, a library function or the operating system executing on the guest virtual machine) to curtail a timing side-channel attack or prevent it from happening again. These countermeasures may include modifying the update frequency parameter (e.g., increasing the update frequency to counter frequent merges), modifying the NONCE value size (e.g., to reduce the possibility of collisions), and/or changing secret data (e.g., changing the value of a cryptography key in response to determining that it may have been compromised). In another example, if it is observed that updating the random number takes longer than expected, it may be assumed that the access caused a page fault and that the page (e.g., a page that stores a cryptography key) had been shared before (thus compromising its contents). In this example, it may be assumed that the cryptography key has been broken and that late countermeasures should be taken (e.g., to revoke the key or take some other appropriate action).

As previously noted, a cache line flush type instruction used by an attacking program in carrying out a timing side-channel attack (e.g., the CLFLUSH instruction of the x86 instruction set) may not trap and may not be restricted in terms of its use by users (e.g., clients or guests) and/or by privileged processes (e.g., operating system kernels, hypervisors, or virtual machine monitors) land. Therefore, there may be no hardware mechanisms available that can be used to effectively filter for this instruction (i.e., to limit or restrict its use). However, the techniques described herein may in some embodiments be used to simulate the effects of a trap on a cache line flush type instruction and, consequently, to detect, prevent, mitigate, and/or curtail this type of timing side-channel attack.

In some embodiments, the processors in the system (i.e., the CPUs), or another unit in the system (e.g., a performance monitor unit, or PMU) may contain some facilities to monitor the behavior of the CPUs at runtime. For example, in some embodiments, the CPUs or PMUs may include various performance counters from which statistics about various behavioral aspects of the system can be obtained. In some embodiments, the processors may include a specific (dedicated) performance counter that counts the number of occurrences of a cache line flush type instruction (e.g., the number of times that the CLFLUSH instruction is executed). In some embodiments, such counters may be configured (e.g., programmed) in such a way so that they trigger an interrupt after a pre-determined number of occurrences has been detected. In such embodiments, this may invoke an interrupt handler that is configured to determine whether the cache line flush type instructions are being executed as part of a timing side-channel attack and, if so, to take action to mitigate the effects of the attack or to curtail the attack. For example, in response to an interrupt being triggered by a performance counter that counts cache line flushes, an executing program (e.g., a security component of the operating system) may be trapped into the kernel hypervisor (or another component that is controlling the PMU). At that point, it may be able to obtain information about the portion of the suspected attacking program (e.g., by inspecting the code in the neighborhood of the detected cache line flush type instructions) and/or take appropriate action. As described in more detail herein, in response to determining that the detected cache line flush type instructions are likely being executed as part of a timing side-channel attack, the security component may be configured to modify the program instructions of the process or application that included the detected cache line flush type instructions (e.g., patching the process or application to replace native-code representations of these instructions with native-code representations of other instructions) and/or modifying the page mapping of the process or application that included the detected cache line flush type instructions.

Note that in some embodiments, a CPU may include more and/or different types of performance counters, such as those that are (or can be) configured to observe and/or count cache misses, cache hits, certain cache refill pattern (e.g., when a level 2 cache line is refilled from a level 3 cache), or other conditions that could trigger an interrupt in the case that a process or application executes a collection of a cache line flush type instructions and/or other instructions.

In various embodiments, any of these performance counters may be employed as a weak trapping mechanism. For example, in some embodiments, the threshold at which one of these performance counters triggers an interrupt may be set very low (e.g., to one), leading to nearly synchronous interrupts following cache line flushes in the system, and allowing the system to quickly initiate counter measures. In other words, by configuring the performance counter to trigger an interrupt after a single occurrence of a cache line flush type instruction (or of other condition that indicates the execution of a cache line flush type instruction), a security component in the system may emulate trapping on a cache line flush type instruction. Note that although these performance counter traps are taken after the fact (i.e., after the cache line flush instruction has been executed rather than prior to executing this instruction, as would typically be the case when trapping on a prohibited or instruction), since a timing side-channel attack is statistical in nature (i.e., since it typically relies on the execution of a large number of cache line flush type instructions), it may be acceptable to receive an indication that one or more cache line flush instructions have been executed after the fact. In various embodiments, the threshold for the number of occurrences of a cache line flush or other condition that triggers an interrupt may be set to different values to allow for a tradeoff between high system overhead due to excessive amounts of interrupts and synchronicity of the detection of a potential threat. For example, when using a performance counter that does not directly target cache line flush type instructions (e.g., one that does not count occurrences of cache line flush type instructions, but counts occurrences of other conditions that may indirectly indicate the execution of cache line flush type instructions), this tradeoff may result in setting the threshold higher than when using a performance counter that directly counts occurrences of cache line flush type instructions. In general, the techniques described herein for detecting, preventing, mitigating, and/or curtailing a timing side-channel attack may include programming one or more performance counters to trigger an interrupt in response to detecting any condition indicative of the execution of a cache line flush type instruction.

Note that the occurrence of cache line flush type instructions in a user application does not necessarily indicate that a timing side-channel attack is under way. For example, in various embodiments and systems, there may any number of legitimate uses for the cache line flush type instruction. For example, a system that includes a highly optimized application that is aware of its working set (e.g., it knows that it will not touch a particular area of memory again in the near future), and that also requires a high level or number of fast memory accesses may implement active management of its memory. In such embodiments, the application may start to flush some areas of memory from of the cache. In this scenario, the cache line flush type instructions used by the application may not repeatedly target the same memory lines. By contrast, an attacking program may repeatedly target the same few memory lines. Therefore, by inspecting the program instructions (e.g., a native-code representation of the program instructions, such as a binary code representation of the program instructions in the neighborhood of the cache line flush type instructions (e.g., to determine the targeted locations and/or the frequency at which they are flushed and/or loaded), a security component may be able to determine whether or not an attack is likely under way. In other embodiments, a security component may be configured to observe the behavior of a suspected attacking program (e.g., one that includes cache line flush type instructions) over time to determine the locations and/or types of the memory areas that are targeted by the cache line flush type instructions over time. It some embodiments, it may not be necessary to prevent the attack (once suspected). Instead, the techniques described herein may be used in a honeypot type environment to monitor the behavior of various processes and/or applications and to build a database of suspicious programs or suspicious customers to be subsequently investigated or dealt with, rather than immediately taking action.

As previously noted, in some embodiments, a security module in the operating environment or the hypervisor may be configured to perform the code inspection operations described herein. In some embodiments, hooks may be included in the code that drives the PMU under normal operation to establish special code for determining whether a timing side-channel attack is likely under way and/or for taking appropriate action, if so. For example, the special code (which may be invoked by an interrupt handler, in some embodiments) may be configured to first inspect the code of the suspected attacker (e.g., in the neighborhood of the cache line flush type instructions) and/or in the neighborhood of the locations that are being targeted by the cache line flush type instructions (e.g., in an observed or target application) to determine whether it is actually that case that the cache line flush instructions are being used in a manner that is in some way suspicious, and if so, to implement one of various available approaches to document or curtail the attack or to mitigate its effects. This may include applying one or more of the approaches described herein or taking any other approach that is appropriate in the particular context (e.g., the system environment, the targeted process, and/or other specific characteristics of the attack).

As previously noted, detecting that an IMP has been subject to same-page merging or has been the target of timing side-channel attack (or an attempted attack) may serve as a trigger to perform an operation to update one or more NONCE values on the affected memory page(s). One embodiment of a method for updating NONCE values within memory pages of interest is illustrated by the flow diagram in FIG. 4. As illustrated at 410, in this example, the method may include beginning execution of a guest application into which NONCE values have been inserted on one or more pages in a system that hosts multiple guests. In this example, if same-page merging is detected for one of the pages that contains a NONCE, shown as the positive exit from 420, the method may include increasing the frequency at which NONCE location(s) on the affected page are updated, as in 425, and updating the value in the NONCE location on the affected page(s), as in 445.

Figure 4:
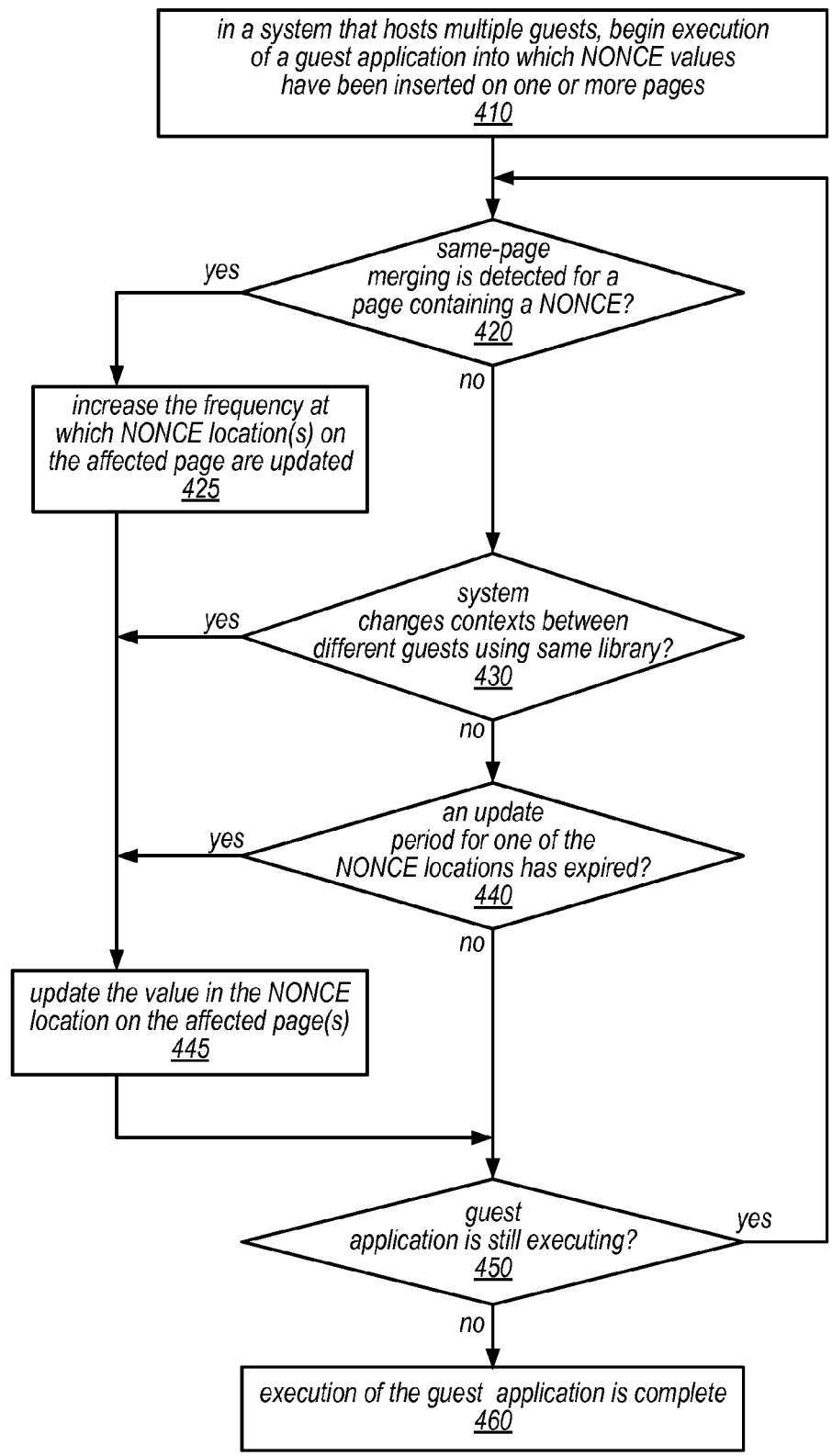
FIG. 4 is a flow diagram illustrating one embodiment of a method for updating NONCE values within memory pages of interest.

As illustrated in this example, in some embodiments, when and if the system changes contexts between different guests using same library (shown as the positive exit from 430), the method may include updating the value in the NONCE location on the affected page(s), as in 445. In addition, if and when an update period for one of the NONCE locations expired, shown as the positive exit from 440, the method may include updating the value in the NONCE location on the affected page(s), as in 445. As illustrated in FIG. 4, while the guest application is still executing, shown as the positive exit from 450, the method may include repeating the operations illustrated in 420-450, until execution of the guest application is complete, as in 460

In some embodiments, a guest may protect itself from timing side-channel attacks by copying a library (or various library functions thereof that are accessed by guest processes) and modifying its code to support the techniques described here for avoiding same-page merging. For example, a guest process may modify a copy of the library (or various functions thereof) by inserting or reserving one or more NONCE placeholder locations into each data structure or function for which it is important to prevent a timing side-channel attack, after which the guest process (or other processes executing in the same guest virtual machine) may invoke the modified library functions rather that an unmodified shared copy of original library code. In this example, an attacker that invokes various functions of the unmodified shared copy of original library code may not know if (or where) a NONCE placeholder location resides within a data structure or code page that is accessed by the library functions. In embodiments in which a shared library (e.g., one that is accessible to an attacking guest process) has been prepared to support the techniques described herein through the insertion of one or more NONCE placeholder locations, the attacker may know the location at which a random number will be inserted, but may not know the value stored in that location, since the actual random number may be instantiated for each program. Note also that any guest application or library code into which NONCE placeholder locations are insert may need to be prepared in such a way as to make room for the NONCE placeholder locations and also such that the random number written into the NONCE placeholder location is not executed as if it were code (e.g., the code into which the NONCE placeholder location may be modified to cause execution to jump over the random number in the NONCE placeholder location so that it is interpreted as actual program code).

Figure 5:
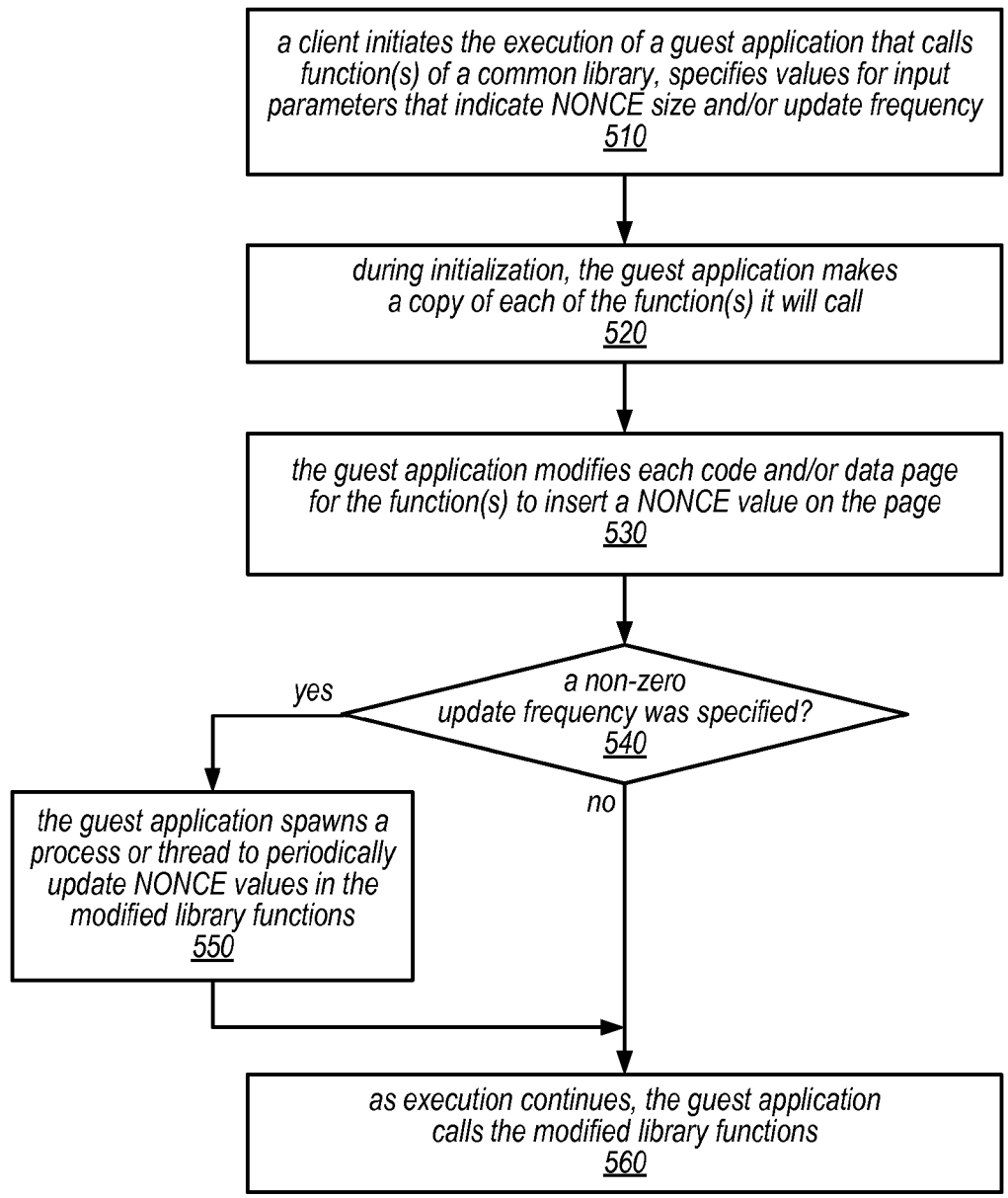
FIG. 5 is a flow diagram illustrating one embodiment of a method for modifying library functions invoked by a guest application to avoid same-page merging.

One embodiment of a method for modifying library functions invoked by a guest application to avoid same-page merging is illustrated by the flow diagram in FIG. 5. As illustrated at 510, in this example, the method may include a client (e.g., a client application, service provider customer or subscriber) initiating the execution of a guest application that calls one or more functions of a common library, which may include specifying values for input parameters that indicate a NONCE size and/or an update frequency for one or more of the NONCEs. The method may include, during an initialization phase or operation, the guest application making a copy of each of the library functions it will call, as in 520. The method may also include (e.g., during the initialization phase or operation), the guest application modifying each code and/or data page for the library function(s) to insert a NONCE value on the page (e.g., nonce values of the specified size, if one is specified), as in 530.

If a non-zero update frequency was specified, shown as the positive exit from 540, the method may include the guest application spawning a process or thread to periodically update NONCE values in the modified library functions, as in 550. On the other hand, if no update frequency was specified, shown as the negative exit from 540, no such process or thread may be spawned. As illustrated in this example, in either case, the method may include, as execution continues, the guest application calling the modified library functions, as in 560, rather than the original (unmodified common library functions).

In some embodiments, the techniques described herein for enabling a guest to protect itself from timing side-channel attacks may employ a registration function within a special library or operating system service on the guest virtual machine. In one example, a library that provides cryptography functions may also provide, e.g., an initialization function through which data structures and/or portions of code that need to be protected from such attacks may be registered. The initialization function may spawn a background thread that exposes an interface (e.g., an API) through which all the pages of interest and their corresponding nonce locations can be registered with the special library. In some embodiments, the background thread may be created by the library in a transparent fashion, after which its functions may be invoked to perform the registration of various data structures and portions of code, the instantiation of memory pages for the corresponding IMPs (each of which includes one or more NONCE placeholder locations), and/or the initialization of NONCE values in those locations. In some embodiments, such a library may be accessed by multiple applications in the same guest independently. For example, the library may maintain data about the NONCE placeholder locations in each guest application independently, and may have one independent thread in each application that manages those locations. In such embodiments, not every application implementer would have to re-implement these techniques, but could instead rely on the functionality that is built into the library.

In another example, the techniques described herein for enabling a guest application to protect itself from timing side-channel attacks may employ a registration function of an operating system service on the guest virtual machine. In such an embodiment, an interface of the operating system service (e.g., an interface through which the application could register its data structures and/or functions that are important and also the locations of the NONCE placeholders within each of those data structures or functions) may be exposed. In various embodiments, the operating system service may either spawn a background thread for each of the applications that register their important data structures or functions, or may spawn one thread that performs these tasks system-wide (e.g., for all applications executing on the guest virtual machine).

Figure 6:
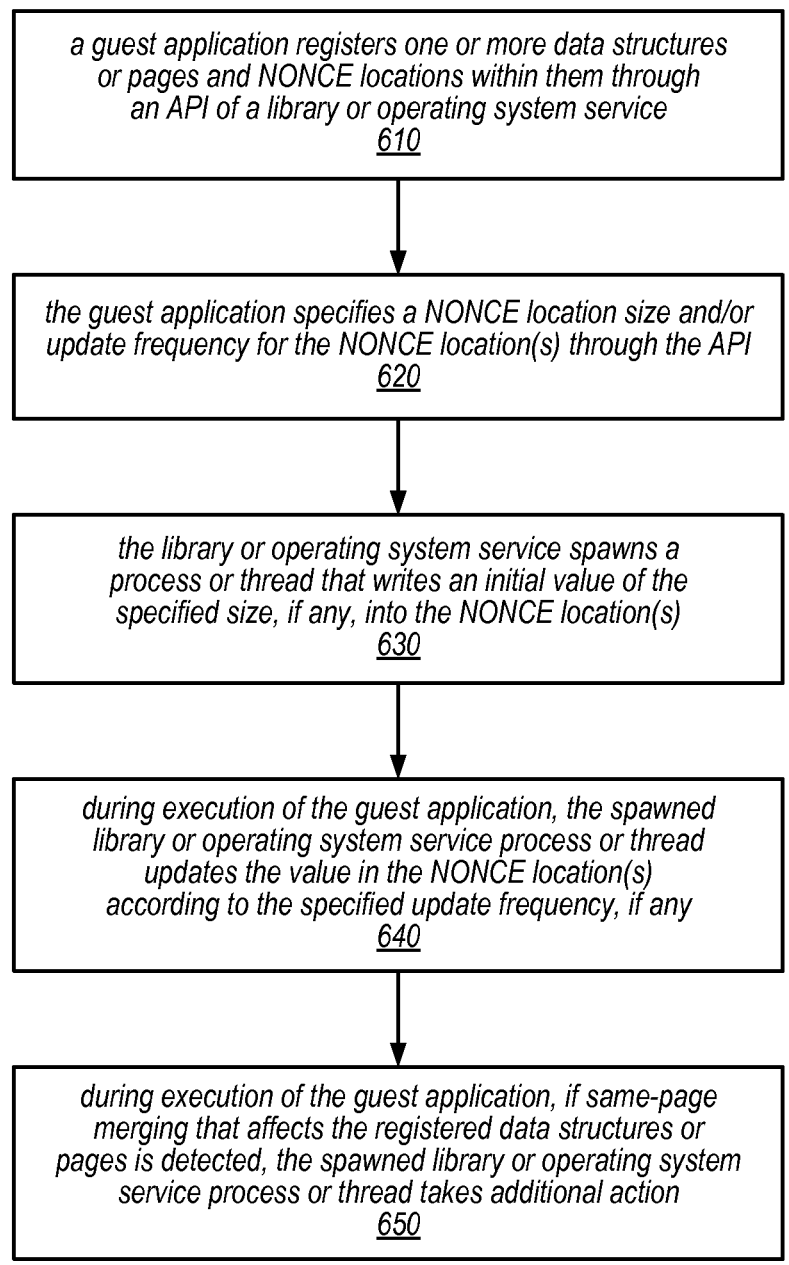
FIG. 6 is a flow diagram illustrating one embodiment of a method for registering memory pages of interest and NONCE placeholder locations therein with a library process or operating system service that instantiates the memory pages and initializes the NONCE values.

One embodiment of a method for registering memory pages of interest and NONCE placeholder locations therein with a library process or operating system service that instantiates the memory pages and initializes the NONCE values is illustrated by the flow diagram in FIG. 6. As illustrated at 610, in this example, the method may include a guest application registering one or more interesting data structures or pages (e.g., critical, important, or sensitive data structures or code pages) and NONCE locations within them through an API of a library or operating system service (e.g. an API that is exposed during initialization of the library or by an operating system service that is configured to support some or all of the techniques described herein, including techniques for avoiding same-page merging involving interesting or sensitive data structures and code pages). In some embodiments, the method may also include the guest application specifying a NONCE location size and/or update frequency for the NONCE location(s) through the API, as in 620.

As illustrated in this example, the method may include the library or operating system service spawning a process or thread that writes an initial value (of the specified size, if a NONCE size was specified) into the NONCE location(s), as in 630. Note that this process or thread may or may not be the same process or thread that instantiates the data structures or pages, in different embodiments. The method may also include, during execution of the guest application, the spawned library or operating system service process or thread updating the value in each of the NONCE location(s), according to the specified update frequency, if any update frequency was specified, as in 640. As illustrated in this example, during execution of the guest application, if same-page merging that affects one or more of the registered data structures or code pages is detected, the method may include the spawned library or operating system service process or thread taking additional action to avoid further same-page merging, as in 650. For example, in various embodiments, the spawned library or operating system service process or thread may update the values in the NONCE locations of any affected data structures or code pages, may increase the frequency at which such updates or performed, or may perform other tasks intended to avoid or prevent same-page merging that affects those data structures or code pages.

As described in detail above, in some embodiments, by adding random values into important pages, a guest application may greatly reduce the chance that any same-page merging that an underlying virtualization environment is performing will merge those important pages with pages to which a potentially attacking guest process could have access. In some embodiments, the designation of various data structures, functions, and/or memory pages as being important to protect from timing side-channel attacks may be the responsibility of the guests themselves. For example, guest processes (e.g., applications, library functions and/or operating systems executing on a guest virtual machine in a virtualization environment that hosts multiple guests) may decide for themselves where (e.g., into which data structures or functions) random values should be inserted, how large they should be, and/or how often (if ever) they should be updated after being instantiated and initialized. In general, the memory pages to which these techniques are applied may be application specific and/or domain specific and include executable code or may important or sensitive (i.e., secret) data. In addition, in order to further reduce the chances that an important page is subjected to same-page merging, the systems described herein may support the specification and/or adjustment of various configurable parameters, such as a parameter whose value specifies the size of the random numbers written into NONCE placeholder locations and/or a parameter that specifies the frequency at which you the values in those NONCE placeholder locations are updated. As described herein, in some embodiments, if same-page merging that affects an important page is detected, additional countermeasures may be taken.

In some embodiments, a library that has been modified to support the techniques described herein (e.g., one that provides writable NONCE locations within some or all of its functions) may be distributed, or otherwise made available, to virtualization service customers who are concerned about privacy, and who may or may not opt to employ them in their guest virtual machines to avoid or prevent timing side-channel attacks. In one example, such a library may include cryptography functions in code pages that have been modified to include NONCE locations and/or a page that is configured to store keys that has been modified in this way. By offering the library to potential virtualization service customers, thus providing them with a way to execute classified applications and maintain classified data on a guest virtual machine while greatly reducing the likelihood that their code or data is the target of a timing side-channel attack, a service provider may be able to strengthen their case for cloud computing. In some embodiments, such a library may be provided as part of an open source software development kit that customers could build into their own applications. In other embodiments, a virtualization service provider may apply the techniques described herein internally, and/or may increase density when hosting multiple guests (or guests for multiple services) on the same machine while enabling the guests to protect themselves from each other. In other words, as a secondary effect, the techniques described herein may allow a virtualization service provider to increase their guest virtual machine density and/or host machine utilization by allowing the use of kernel same-page merging in situations in which it was not otherwise suitable due to security considerations, or may increase trust for cloud computing in general, allowing additional (e.g., different) types of workloads to be hosted on their machines and allowing their business to grow.

In some embodiments, instead of (or in addition to) inserting random numbers into IMPs to prevent them from matching a page accessed by an attacking guest, a guest process (e.g., an application, library function or operating system executing on a guest virtual machine) may perform a binary transformation on a code page that it accesses in a manner that does not affect the operation of the code. For example, a guest process may inspect the actual code that resides on the page and may replace it with an alternative encoding that is functionally equivalent but has a different byte representation.

Note that some embodiments of the techniques described herein for determining whether a timing side-channel attack is underway and/or for mitigating and/or curtailing such an attack (e.g., by a process executing on the host machine) may include configuring a performance monitor (e.g., a performance counter) to trigger an interrupt in response to execution of a pre-determined number of cache line flush type instructions in an executing process or application and configuring a corresponding interrupt handler to inspect and/or modify the program instructions of the process or application in the neighborhood of any detected cache line flush type instruction(s). However, in other embodiments, other mechanisms (including, but not limited to, various hardware or software breakpoint mechanisms) may be used to intercept cache line flush type instructions and redirect execution to an exception or event handler in order to determine whether a timing side-channel attack is underway, or to mitigate and/or curtail such an attack.

In some embodiments, the CPUs or PMUs of the systems described herein may include hardware support for setting breakpoints (e.g., for use in debugging exercises or for other purposes). For example, in some CPU architectures, the processors include one or more dedicated special purpose registers (sometimes referred to as debug registers), each of which may be programmed with a breakpoint address. In such architectures, when an address that is programmed into one of these registers is read, written to, and/or executed, an exception may be triggered, in response to which control may be passed to a debugger or to another type of exception or event handler. In some embodiments in which a host machine process is configured to prevent, mitigate, or curtail an attack, in order to intercept cache line flush type instructions in an executing process or application (e.g., following the detection of a suspicious cache line flush type instruction in the executing process or application), a first exception handler (e.g., one invoked in response to detecting the suspicious cache line flush type instruction) may set a hardware breakpoint at the address of the suspicious cache line flush type instruction. In such embodiments, when and if execution of the process or application returns to that point in the program instructions, the breakpoint will be triggered and execution of the process or application will be directed elsewhere (e.g., to an exception or event handler for the hardware breakpoint that is configured to determine whether a timing side-channel attack is underway, or to mitigate and/or curtail such an attack, as described herein).

Similarly, in some embodiments in which a host machine process is configured to prevent, mitigate, or curtail an attack, in order to intercept cache line flush type instructions in an executing process or application (e.g., following the detection of a suspicious cache line flush type instruction in the executing process or application), a first exception handler (e.g., one invoked in response to detecting the suspicious cache line flush type instruction) may set a software breakpoint at the address of the suspicious cache line flush type instruction. For example, in response to detection of the suspicious cache line flush type instruction, the first exception handler may be configured to replace the suspicious cache line flush type instruction with a dedicated software breakpoint instruction (if such an instruction is supported in the instruction set architecture) or with an illegal or undefined instruction encoding, any of which, when encountered during execution of the process or application will trigger a software breakpoint type exception. In such embodiments, when and if execution of the process or application returns to that point in the program instructions, the software breakpoint type exception will be triggered and execution of the process or application will be directed elsewhere (e.g., to an exception or event handler for the software breakpoint type exception that is configured to determine whether a timing side-channel attack is underway, or to mitigate and/or curtail such an attack, as described herein).

Note that in different embodiments, various combinations of the techniques described herein for preventing, mitigating and/or curtailing a timing side-channel attack may be employed in response to determining that a timing side-channel attack is likely under way. For example, in some embodiments a security module of an operating system or hypervisor, a trap handler, an interrupt handler, or another type of exception or event handler (e.g., a breakpoint handler) may be configured to modify both the program instructions and the page mapping of a suspected attacker one or more times (e.g., modifying different portions of the code and/or modifying the page mapping of different pages each time) in response to determining that a timing side-channel attack is likely under way. In other embodiments, a security module of an operating system or hypervisor, a trap handler, an interrupt handler, or another type of exception or event handler (e.g., a breakpoint handler) may be configured to first modify the program instructions of a suspected attacker one or more times (e.g., modifying different portions of the code each time) in response to determining that a timing side-channel attack is likely under way, and to subsequently modify the page mapping of one or more pages of the suspected attacker (e.g., modifying the page mapping for one shared memory area and then another), or vice versa, if the first attempt(s) to prevent, mitigate and/or curtail the suspected attack are not sufficient. In still other embodiments, a guest process may protect itself from a timing side-channel attack, or may take steps to mitigate or curtail such an attack, if it is detected, as described herein.

As previously noted, a timing side-channel attack may be carried out (or attempted) in a virtualized computing environment in which there may be many instances of virtualized computing resources executing on behalf of guests. In some embodiments, the techniques described herein may be employed as a security feature of the virtualized computing system (e.g., by the operations a security module of a hypervisor or virtual machine monitor in the system, or by providing functions in a library that have been prepared to support the insertion and updating of random values within memory pages or interest). In some embodiments, these techniques may be employed in a cloud computing environment in which multiple customers may share virtualized computing resources and/or storage resources on a single physical machine to detect, prevent, mitigate, and/or curtail a timing side channel attack. For example, in systems in which shared logins are provided on physical machines, a customer may be able to load malicious code onto an individual user's machine that could potentially carry out this type of attack, and the techniques described herein may be employed to prevent such an attack or in response to detection of such an attack.

Figure 7:
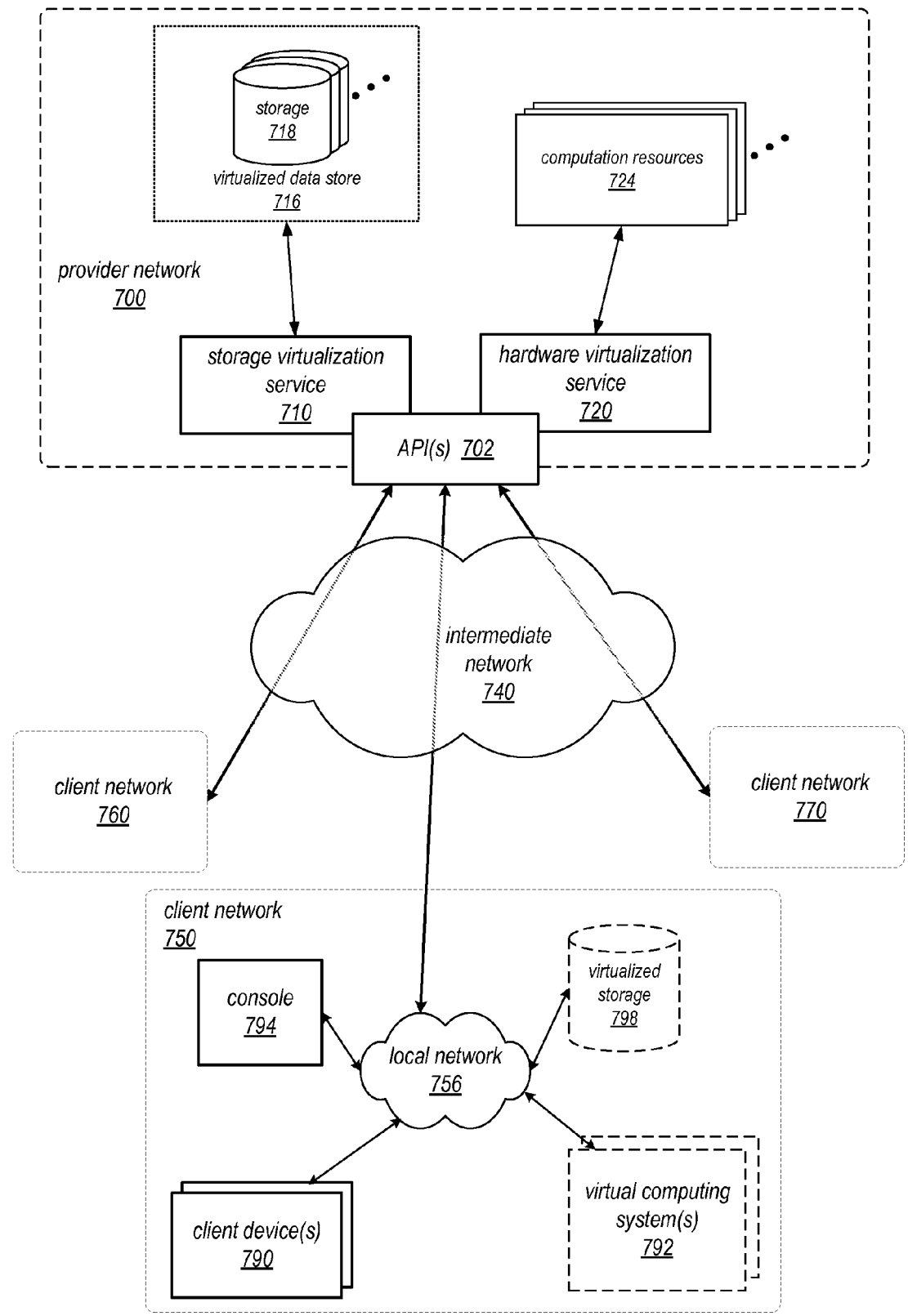
FIG. 7 is a block diagram illustrating an example provider network environment in which some or all of the techniques described herein for detecting, preventing, mitigating, and/or curtailing timing side-channel attacks may be employed, according to at least some embodiments.

FIG. 7 is a block diagram illustrating an example provider network environment in which some or all of the techniques described herein for detecting, preventing, mitigating, and/or curtailing timing side-channel attacks may be employed, according to at least some embodiments. In this example, the provider network environment 700 provides a storage virtualization service and a hardware virtualization service to clients. In this example, hardware virtualization service 720 provides multiple computation resources 724 (e.g., VMs) to clients. The computation resources 724 may, for example, be rented or leased to clients of the provider network 700 (e.g., to a client that implements client network 750, client network 760, and/or client network 770) in order to implement various applications, which may include observer (e.g., attacking) applications and/or observed (e.g., target) applications. Each computation resource 724 may be provided with one or more private IP addresses. Provider network 700 may be configured to route packets from the private IP addresses of the computation resources 724 to public Internet destinations, and from public Internet sources to the computation resources 724.

Provider network 700 may provide a client network (e.g., client network 750, 760, or 770 coupled to intermediate network 740 via local network 756) the ability to implement virtual computing systems 792 via hardware virtualization service 720 coupled to intermediate network 740 and to provider network 700. Note that in some embodiments, each of client networks 760 and 770 may include elements that are similar to corresponding elements of client network 750 (not shown) and may provide functionality similar to that of client network 750, while in other embodiments, client network 760 and/or 770 may include more, fewer, or different elements than those illustrated in FIG. 7 as being part of client network 750 and/or may provide functionality that is different than that of client network 750. In some embodiments, hardware virtualization service 720 may provide one or more APIs 702, for example a web services interface, via which a client network 750, 760, or 770 may access functionality provided by the hardware virtualization service 720 via a console such as console 794. In at least some embodiments, at the provider network 700, each virtual computing system at a client network (e.g., a virtual computing system 792 at client network 750) may correspond to a computation resource 724 that is leased, rented, or otherwise provided to the client network.

In this example, from an instance of a virtual computing system 792 and/or another client device 790 or console 794 of a client network 750, 760, or 770, a client may access the functionality of storage virtualization service 710, for example via one or more APIs 702, to access data from and store data to a virtual data store 716 provided by the provider network 700. In some embodiments, a virtualized data store gateway (not shown) may be provided at the client network (e.g., at client network 750, 760, or 770) that may locally cache at least some data, for example frequently accessed or critical data, and that may communicate with storage virtualization service 710 via one or more communications channels to upload new or modified data from a local cache so that the primary store of data (virtualized data store 716) is maintained. In at least some embodiments, a user, via a virtual computing system 792 and/or on another client device 790, may mount and access one or more storage volumes 718 of virtual data store 716, each of which appears to the user as local virtualized storage 798.

Figure 8:
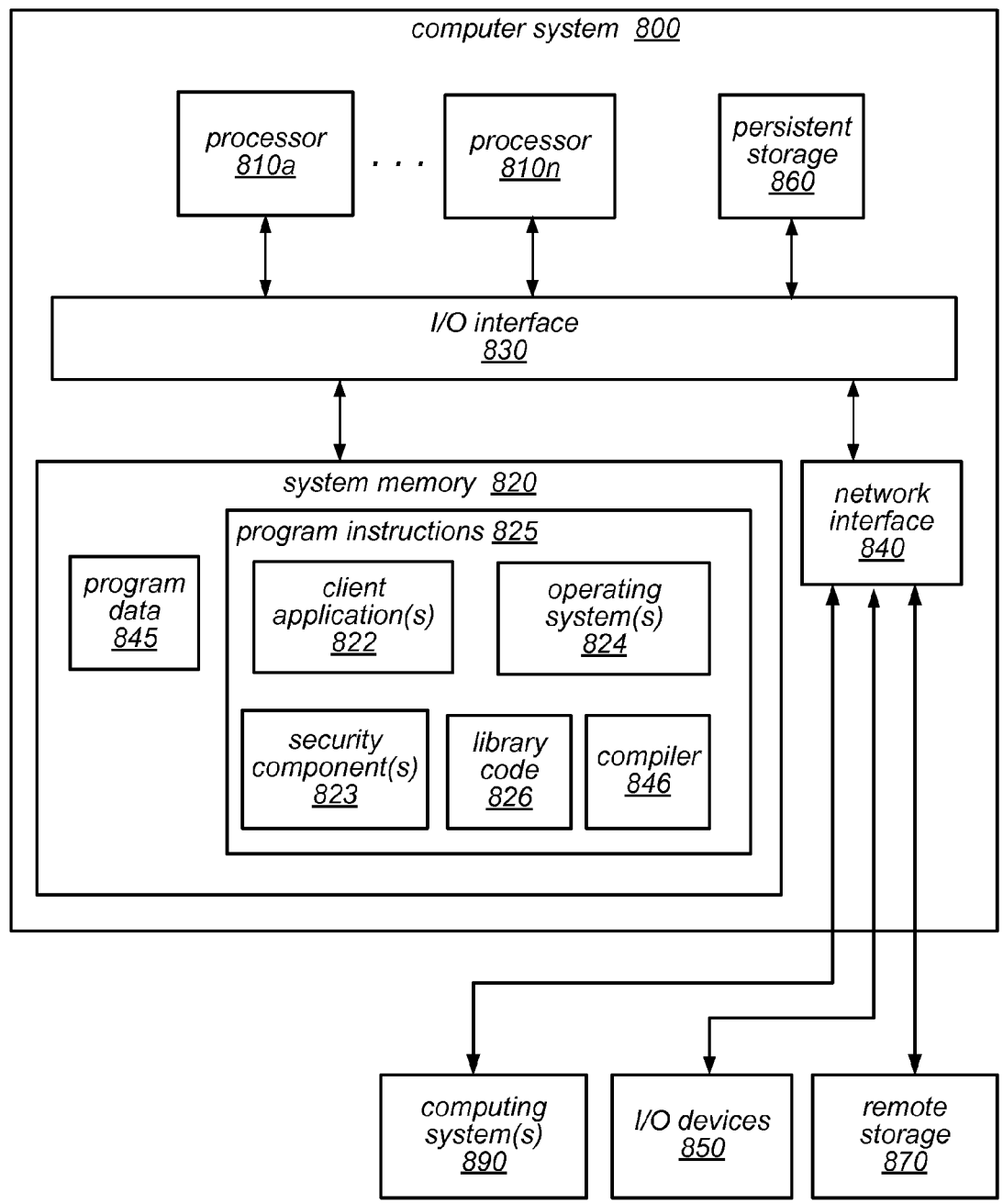
FIG. 8 is a block diagram illustrating a computer system configured to implement some or all of the techniques described herein, according to various embodiments.

The methods described herein may in various embodiments be implemented by any combination of hardware and software. For example, in one embodiment, some or all of the methods may be implemented by a computer system that includes a processor executing program instructions stored on a computer-readable storage medium coupled to the processor. The program instructions may be configured to implement any or all of the functionality described herein for detecting, preventing, mitigating, and/or curtailing timing side-channel attacks (e.g., by a security component of a host machine or by a process executing on a guest virtual machine, in different embodiments). FIG. 8 is a block diagram illustrating a computer system configured to implement some or all of the techniques described herein, according to various embodiments. Computer system 800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Note that computer system 800 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein.

Computer system 800 includes one or more processors 810 (any of which may include multiple cores, which may be single or multi-threaded) coupled to a system memory 820 via an input/output (I/O) interface 830. Note that while several examples described herein are directed to systems in which the processors implement an x86 instruction set, the techniques described herein are not limited to such embodiments. Computer system 800 further includes a network interface 840 coupled to I/O interface 830. In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. The computer system 800 also includes one or more network communication devices (e.g., network interface 840) for communicating with other systems and/or components over a communications network (e.g. Internet, LAN, etc.). For example, a client application executing on system 800 may use network interface 840 to communicate with a server application executing on a single server or on a cluster of servers that implement a distributed system. In another example, an instance of a server application executing on computer system 800 may use network interface 840 to communicate with a client application and/or with other instances of the server application that may be implemented on other computer systems.

In the illustrated embodiment, computer system 800 also includes one or more persistent storage devices 860. In various embodiments, persistent storage devices 860 may correspond to disk drives, tape drives, solid state memory, other mass storage devices, or any other persistent storage device. Computer system 800 (or an application, software component, or operating system operating thereon) may store instructions and/or data in persistent storage devices 860, as desired, and may retrieve the stored instruction and/or data as needed.

Computer system 800 includes one or more system memories 820 that are configured to store instructions and data accessible by processor 810. In various embodiments, system memories 820 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein for detecting, preventing, mitigating, and/or curtailing timing side-channel attacks, e.g., configuring a performance monitor or breakpoint mechanism to emulate trapping on a cache line flush type instruction; configuring a trap handler, an interrupt handler, or another type of exception or event handler (e.g., a breakpoint handler) to inspect program instructions of a process or application that executes a pre-determined number of cache line flush type instructions or triggers a breakpoint, or to mitigate or curtail a suspected timing side-channel attack by inspecting program instructions in the neighborhood of the detected cache line flush type instructions, modifying the program code and/or page mapping of a process or application if it is suspected of carrying out a timing side-channel attack, and/or avoiding same-page merging of memory pages of interest to a guest process. In various embodiments, program instructions 825 may be encoded in platform native binary, any interpreted language such as Java™ byte-code, or in any other language such as C/C++, Java™, etc., or in any combination thereof. For example, in the illustrated embodiment, program instructions 825 include program instructions executable to implement one or more client application(s) 822 (which may include observer programs that carry out, or attempt to carry out, timing side-channel attacks and/or observed applications that may be targeted by a timing side-channel attack), various security component(s) 823, library code 826, compiler 846, and/or operating system(s) 824, which may include or be implemented as a hypervisor or virtual machine monitor, or any of various operating systems, such as UNIX, LINUX, Solaris™, MacOS™, Windows™, etc. Note also that in various embodiments, a security component 823 or library code 826 may be implemented as a component of an operating system 824.

Note that in various embodiments, some or all of system memory 810 (including some or all of program instructions 825 and/or program data 845) may be implemented within shared physical memory pages in a stand-alone computing system or in a system that provides virtualized resources to clients, as described herein. Note also that in some embodiments, library code 826 may be loaded into a portion of system memory 820 other that the portion of system memory 820 that includes program instructions 825 and/or may include a private copy of a shared library (or a portion thereof) for the use of a suspected attacker following de-duplication, shared pages or a remapping of the pages of the suspected attacker, or a modified copy of a shared library that includes NONCE placeholder locations and that is accessed by a guest process to avoid same-page merging of the memory pages for the library code. Similarly, program data 845 may in some embodiments include memory pages that contain important data structures and/or sensitive program data into which NONCE placeholder locations have been inserted.

Any or all of program instructions 825, including client application(s) 822, security component(s) 823, library code 826, compiler 846, and/or operating system(s) 824, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In some embodiments, system memory 820 may include storage for program data 845, such as the data structures of client applications, information about registered data structures or code pages, and/or parameter values for NONCE location sizes and/or update frequencies as described herein. In various embodiments, system memory 820 (e.g., program data 845 within system memory 820) and/or remote storage 870 may also store information about suspected attacks or suspicious clients, customers, or programs, code path information or branch histories, performance monitor data (such as data from one or more hardware or software performance counters), and/or any other information usable in implementing the methods and techniques described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as other computer systems 890 (which may implement one or more server nodes and/or clients of a distributed system), for example. In addition, network interface 840 may be configured to allow communication between computer system 800 and various I/O devices 850 and/or remote storage 870. Input/output devices 850 may, in some embodiments, include one or more display terminals, keyboards, keypads, touchpads, scanning devices, voice or optical recognition devices, or any other devices suitable for entering or retrieving data by one or more computer systems 800. Multiple input/output devices 850 may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computer system 800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
    performing by one or more computers:
        preparing application code for execution as a guest process in a virtualization environment that hosts multiple guests, wherein said preparing comprises:
            identifying, in the application code, a data structure or portion of code as a likely target of a timing side-channel attack by another one of the multiple guests;
            inserting, within the identified data structure or portion of code, in response to said identifying, a placeholder location for storing a non-deterministic value that does not alter execution of the guest process;
        initiating execution of the guest process in the virtualization environment, wherein said initiating comprises:
            instantiating a page in memory containing the data structure or code that was identified as a likely target of a timing side-channel attack by another one of the multiple guests, wherein said instantiating comprises writing a random or pseudorandom value into the placeholder location; and
        executing the guest process in the virtualization environment.

2. The method of claim 1, further comprising:
    updating, during execution of the guest process, the non-deterministic value stored in the placeholder location.

3. The method of claim 2, wherein said updating comprises writing the random or pseudorandom value into the placeholder location a second time.

4. The method of claim 1, wherein the identified data structure or portion of code comprises a data structure that stores one or more cryptography keys or a portion of code that implements one or more cryptographic functions or that interacts with sensitive or secret data.

5. The method of claim 1,
    wherein said inserting the placeholder location comprises:
        inserting the placeholder location in a writable copy of the portion of code; and
    wherein said executing comprises executing the writable copy of the portion of code into which the placeholder location has been inserted.

6. The method of claim 1, wherein said preparing is performed by a compiler in response to determining that the data structure or portion of code was designated by a programmer as a likely target of a timing side-channel attack.

7. A system, comprising:
    a virtualization environment, implemented by one or more computing devices and configured to host multiple guest processes on behalf of one or more clients;
    wherein, during execution, a given one of the multiple guest processes is configured to:
        write, into a placeholder location within a data structure or portion of code instantiated in a page of memory that has been designated as a memory page of interest, a non-deterministic value that does not alter execution of the given guest process; and
        update, in response to a pre-determined trigger condition being met, the non-deterministic value stored in the placeholder location.

8. The system of claim 7, wherein to write the non-deterministic value into the placeholder location, the given guest process is configured to:
    invoke a random number generator or a pseudorandom number generator to generate the non-deterministic value; and
    write the generated non-deterministic value into the placeholder location.

9. The system of claim 7, wherein the virtualization environment is configured to perform same-page merging of duplicate pages in its memory.

10. The system of claim 9,
    wherein the page of memory that has been designated as a memory page of interest is a memory page for which same-page merging is to be avoided.

11. The system of claim 7, wherein the data structure or portion of code instantiated in the page of memory that has been designated as a memory page of interest is a potential target of a timing side-channel attack by another one of the multiple guest processes.

12. The system of claim 7, wherein the page of memory that has been designated as a memory page of interest comprises code configured to implement one or more library functions that are invoked during execution of the given guest process.

13. The system of claim 7, wherein the page of memory that has been designated as a memory page of interest comprises code configured to implement one or more cryptographic functions or code configured to implement one or more functions that interact with sensitive or secret data.

14. The system of claim 7, wherein the page of memory that has been designated as a memory page of interest comprises data that is considered sensitive or secret by a client on whose behalf the given guest process is hosted in the virtualization environment.

15. The system of claim 7, wherein the pre-determined trigger condition comprises a context change between two of the multiple guest processes or a determination that samepage merging was performed for the page of memory that has been designated as a memory page of interest.

16. The system of claim 7, wherein the pre-determined trigger condition comprises expiration of update period defined by a value of a configurable parameter that specifies an update frequency.

17. The system of claim 7, wherein the size of the placeholder location is defined by a value of a configurable parameter that specifies the placeholder location size.

18. A non-transitory computer-readable storage medium storing program instructions that when executed on one or more computers cause the one or more computers to perform:
    registering, by an initialization operation of an application executing on a guest virtual machine in a virtualization environment, through an application programming interface exposed by a process of a library or operating system service that is executing on the guest virtual machine, one or more data structures or portions of code to be protected from same-page merging and a respective placeholder location within each of the one or more data structures or portions of code;
    instantiating, by the process of the library or operating system service, a respective page in memory for each of the one or more registered data structures or portions of code; and
    continuing execution of the application, wherein said continuing execution comprises accessing each of the one or more registered data structures or portions of code;
    wherein, for each of the one or more registered data structures or portions of code, the respective page instantiated in memory comprises its registered placeholder location; and
    wherein said instantiating comprises the process of the library or operating system service writing a respective non-deterministic value into the registered placeholder location within the respective page in memory for each of the one or more registered data structures or portions of code.

19. The non-transitory computer-readable storage medium of claim 18, wherein, when executed on the one or more computers, the program instructions further cause the one or more computers to perform:
    specifying, by the initialization operation of the application, through an application programming interface exposed by the process of the library or operating system service, a size for the registered placeholder location within the respective page in memory for each of the one or more registered data structures or portions of code.

20. The non-transitory computer-readable storage medium of claim 18, wherein, when executed on the one or more computers, the program instructions further cause the one or more computers to perform:
    spawning, by the library or operating system service, a process that is configured to update the non-deterministic value that was written into the registered placeholder location within the respective page in memory for each of the one or more registered data structures or portions of code.

21. The non-transitory computer-readable storage medium of claim 18, wherein when executed on the one or more computers, the program instructions cause the one or more computers to perform:
    specifying, by the initialization operation of the application, through an application programming interface exposed by the process of the library or operating system service, a frequency at which the non-deterministic value written into the registered placeholder location within the respective page in memory for each of the one or more registered data structures or portions of code is to be updated.

* * * * *